(12) United States Patent
Mattarelli

(10) Patent No.: US 7,217,897 B2
(45) Date of Patent: May 15, 2007

(54) BACKPANEL INSERTION SWITCH

(75) Inventor: Andrea Mattarelli, Verona (IT)

(73) Assignee: Scoieta' Europea Componenti Elettrici S.p.A. In Short S.E.C.E. S.p.A., Valeggio sul Mincio (IT)

( * ) Notice: Subject to any disclaimer, the term of this patent is extended or adjusted under 35 U.S.C. 154(b) by 0 days.

(21) Appl. No.: 11/290,595

(22) Filed: Dec. 1, 2005

(65) Prior Publication Data

US 2006/0131149 A1     Jun. 22, 2006

(30) Foreign Application Priority Data

Dec. 10, 2004   (IT) ................... VR20040040 U

(51) Int. Cl.
*H01H 13/00* (2006.01)
*H01H 3/00* (2006.01)

(52) U.S. Cl. ................ 200/329; 200/314; 200/318; 200/293

(58) Field of Classification Search ............ 200/310, 200/314, 318, 318.1, 320, 321, 323, 329
See application file for complete search history.

(56) References Cited

U.S. PATENT DOCUMENTS

| 3,377,452 | A | * | 4/1968 | Mutschler et al. | 200/314 |
| 3,626,171 | A | * | 12/1971 | Abramowitz et al. | 200/314 |
| 4,431,879 | A | * | 2/1984 | Fujita et al. | 200/314 |
| 5,727,675 | A | * | 3/1998 | Leveque et al. | 200/524 |
| 6,333,478 | B1 | | 12/2001 | Altmann | |

* cited by examiner

*Primary Examiner*—Kyung S. Lee
*Assistant Examiner*—Lheiren Mae A. Anglo
(74) *Attorney, Agent, or Firm*—Nodiano & Associati; Albert Josif; Daniel O'Byrne

(57) ABSTRACT

A switch comprising a switch body and a control actuator, which can be associated with a control button and can move with respect to the switch body, the control actuator having a receptacle for a light source at a containment portion which is directed toward the button: the switch body is provided with fixing elements for a panel, by backpanel insertion, which comprise at least two abutment portions and at least two locking elements which act, with the panel in the mounted position, respectively at opposite faces of the panel, the two locking elements being arranged proximate to the button. Elements for detachable connection between the button and the control actuator are also provided.

8 Claims, 7 Drawing Sheets

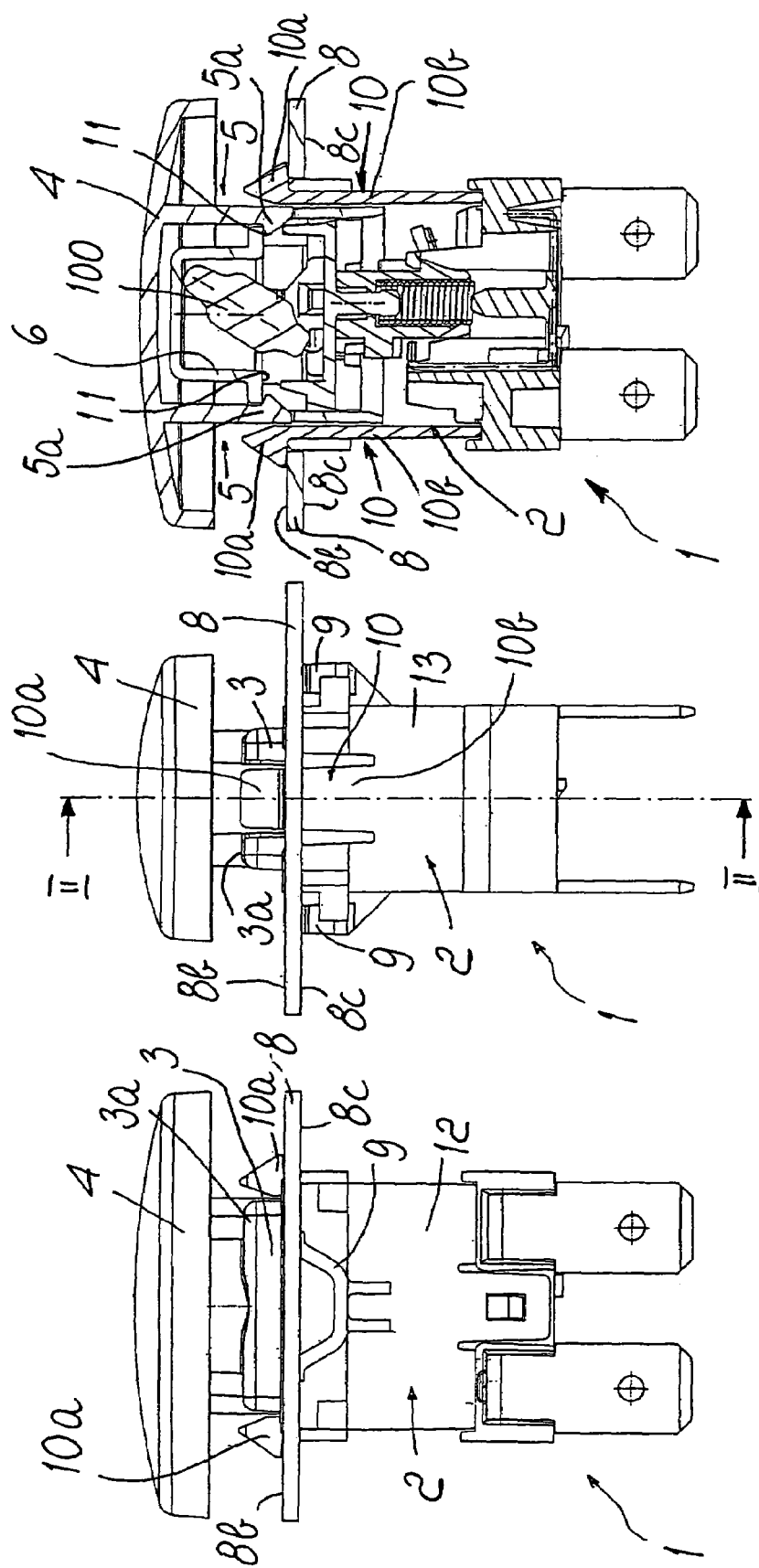

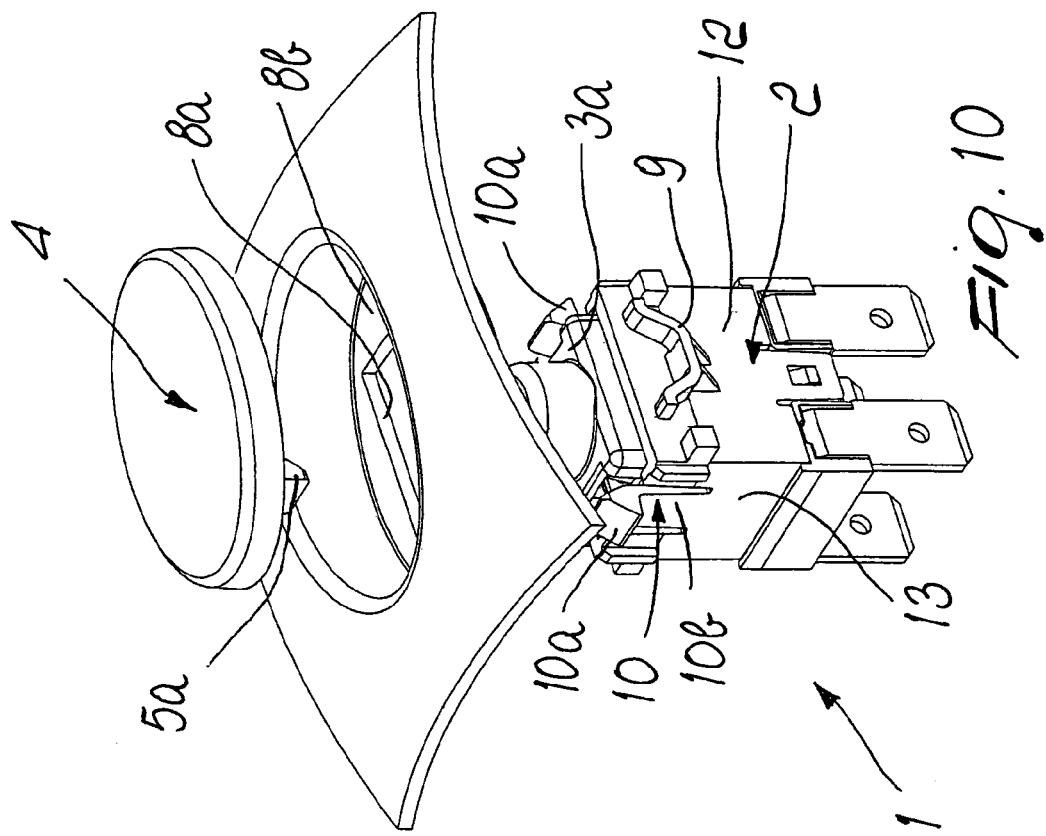
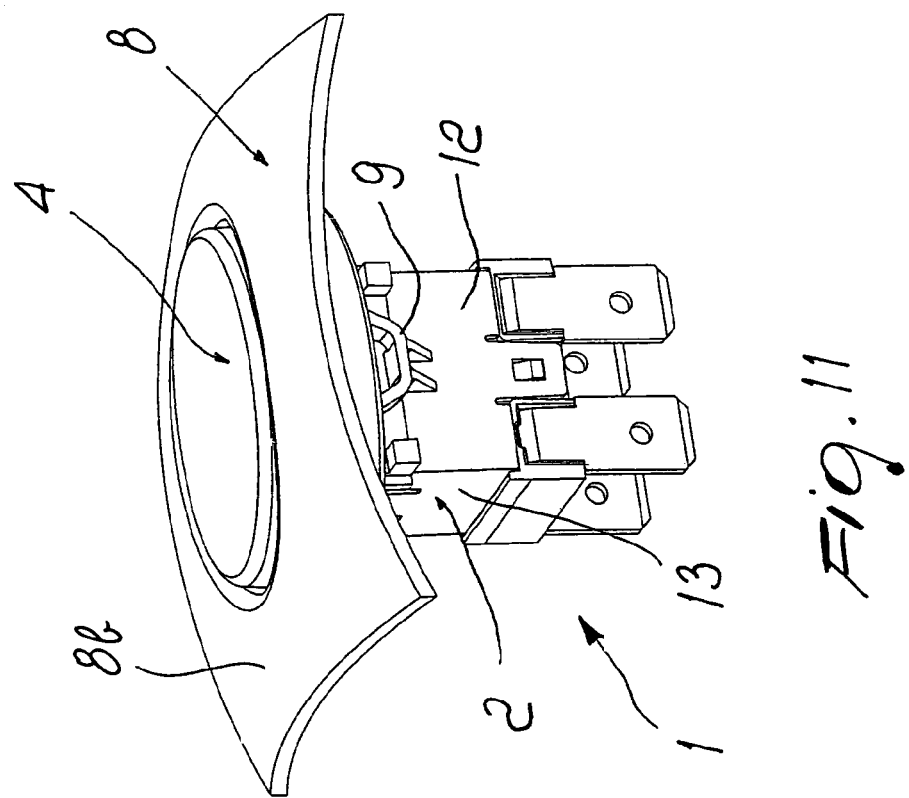

BACKPANEL INSERTION SWITCH

The present invention relates to a switch, particularly suitable for use in household electrical appliances and the like.

BACKGROUND OF THE INVENTION

Currently, with particular reference to applications to household electrical appliances, the most widely used switches are constituted by a switch body, provided with the components required for its operation, which optionally can be associated with a button lighting device at a containment portion which lies below the button.

Generally, in these kinds of application, the switch body is associated with a panel and then the switch (constituted by the switch body and by the panel associated therewith) is fitted to the household electrical appliance.

It is evident that although these switches can be offered with the possibility to light the button, they do not allow customization (except for the panel) depending on the type of application or in relation to the company that markets the household electrical appliance on which the switch is fitted.

If the button is to be customized it is in fact necessary to use switches in which so-called backpanel mounting is provided.

However, switches in which backpanel mounting is provided, due to the particular configuration and the types of connection among the various structural elements that constitute the switch, do not allow the option of lighting the button.

SUMMARY OF THE INVENTION

The aim of the present invention is to provide a new switch provided with a button lighting device.

Within this aim, an object of the invention is to provide a switch in which the button can be optionally customized by the user.

Another object of the present invention is to provide a switch with backpanel insertion.

Another object of the invention is to provide a switch which has a very simple structure, is highly durable and easy to use and has a competitive production cost, so that its use is advantageous also from an economical standpoint.

This aim and these and other objects, which will become better apparent hereinafter, are achieved by a switch comprising a switch body and a control actuator, which can be associated with a control button and can move with respect to said switch body, characterized in that the control actuator has a receptacle for a light source at a containment portion which is directed toward the button, the switch body being provided with fixing means for a panel, by backpanel insertion, which comprise at least two abutment portions and at least two locking elements which act, with the panel in the mounted position, respectively at opposite faces of said panel, the two locking elements being arranged proximate to the button, means for detachable connection between the button and the control actuator being further provided.

BRIEF DESCRIPTION OF THE DRAWINGS

Further characteristics and advantages of the invention will become better apparent from the description of some preferred but not exclusive embodiments of a switch according to the invention, illustrated by way of non-limiting example in the accompanying drawings, wherein:

FIG. 1 is a side elevation view of a switch according to the present invention;

FIG. 2 is a sectional view of the switch, taken along the plane of arrangement II—II of FIG. 1;

FIG. 6 is a side elevation view of the switch of FIGS. 1 to 5;

FIG. 10 is an exploded perspective view of the switch shown in FIGS. 7 to 9;

FIG. 11 is a perspective view of the switch shown in FIGS. 7 to 10;

Figure 3:
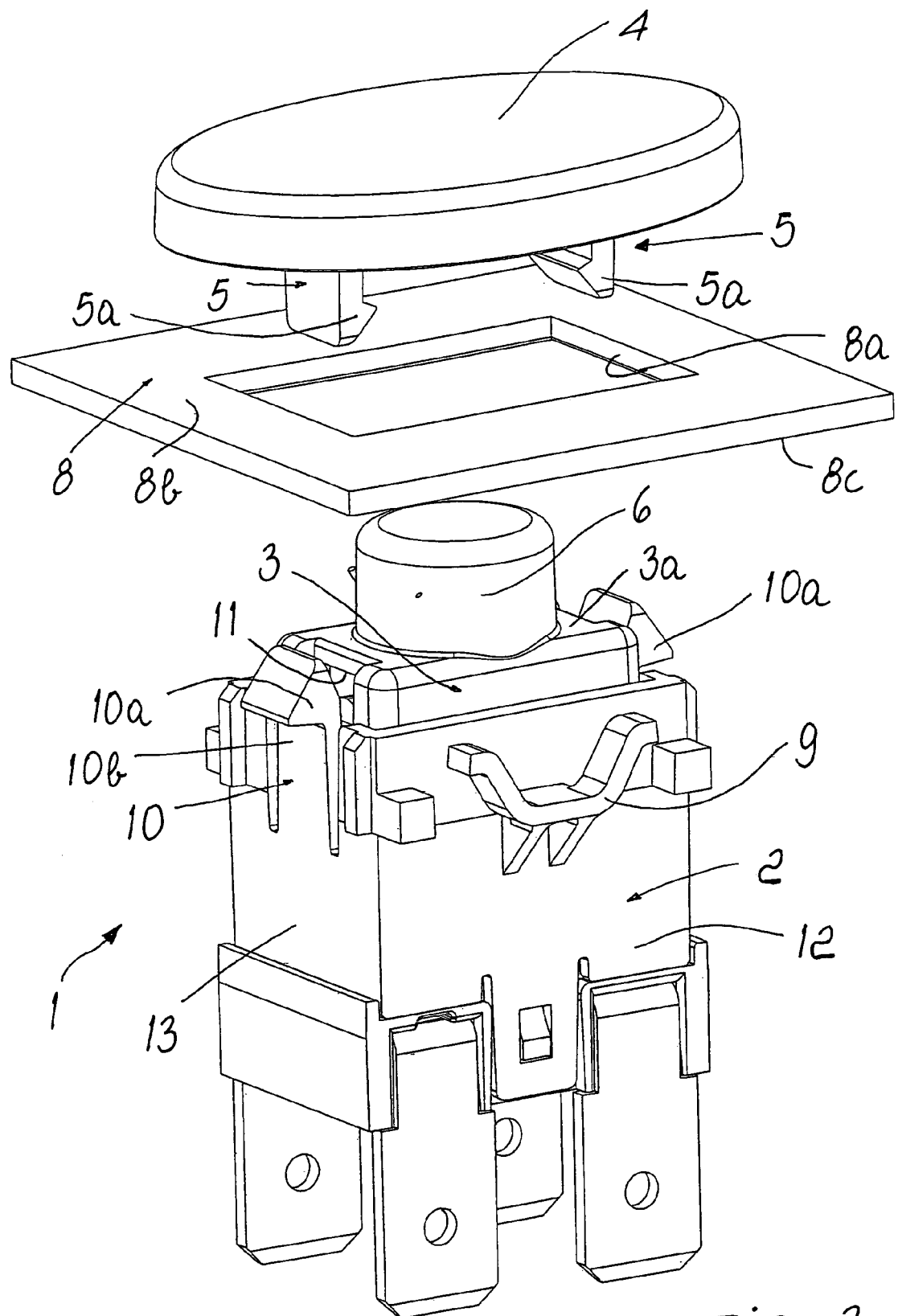
FIG. 3 is a perspective view of the switch with the panel and the button disassembled.
Figure 4:
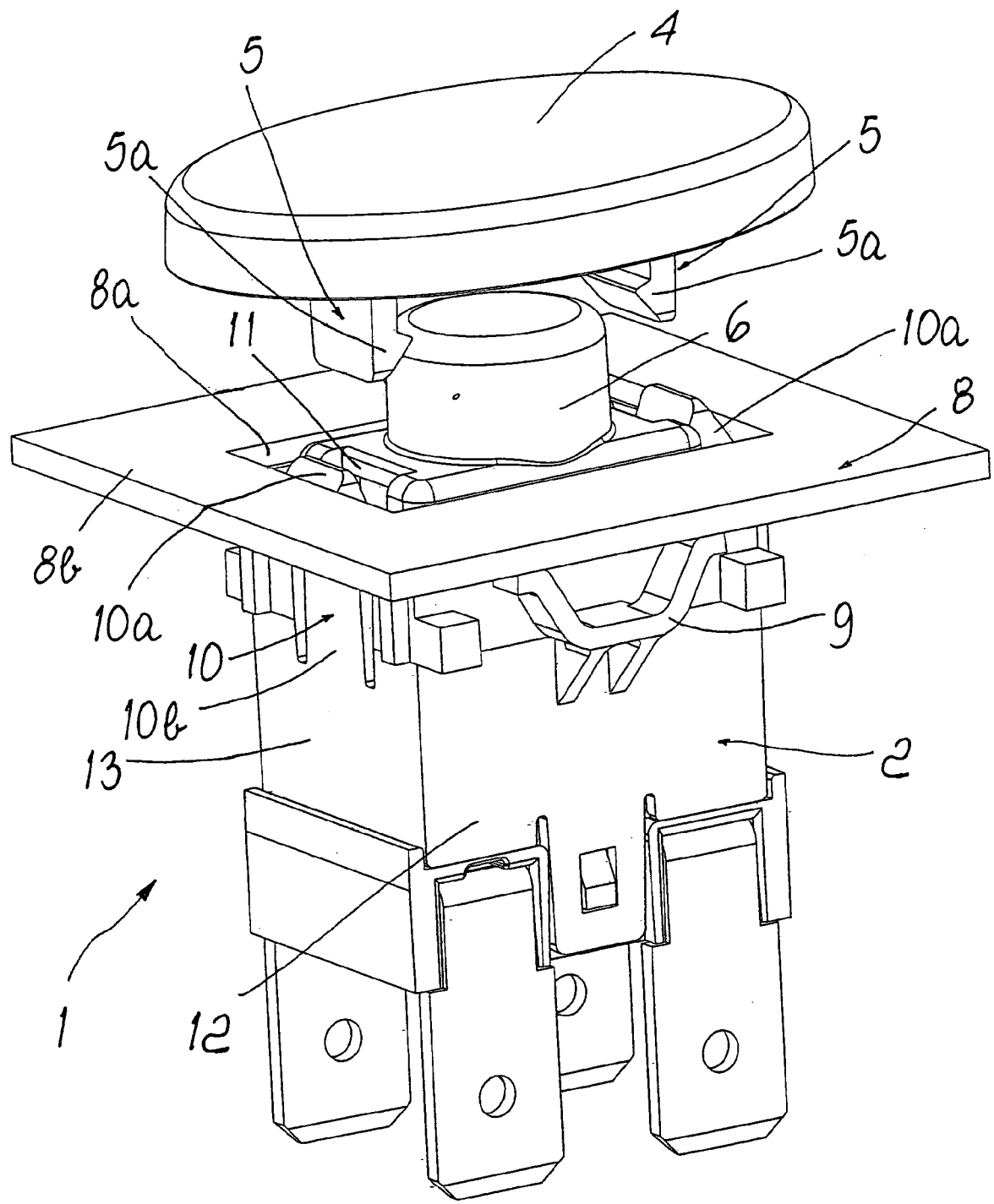
FIG. 4 is a view, similar to FIG. 3, with the panel and the button during assembly.

In the examplary embodiments that follow, individual characteristics, given in relation to specific examples, may actually be interchanged with other different characteristics that exist in other examplary embodiments.

Moreover, it is noted that anything found to be already known during the patenting process is understood not to be claimed and to be the subject of a disclaimer.

DESCRIPTION OF THE PREFERRED EMBODIMENTS

With reference to the figures, a switch according to the invention, generally designated by the reference numeral 1, comprises a switch body 2 and a control actuator 3.

The control actuator 3 can move with respect to the switch body 2 along a movement direction in order to allow the opening and closing of electrical contacts.

The control actuator 3 can be associated, by virtue of detachable connection means 5 described in greater detail hereinafter, with a control button 4.

According to the present invention, the control actuator 3 is provided with a receptacle 6 for a light source 100 at a containment portion 3a which is directed toward the button 4 during use so as to allow the lighting of said button 4.

Also according to the invention, the switch 1 is provided with fixing means 7 for a panel 8 by so-called backpanel insertion, i.e., with reference to the arrangement shown in the figures, by inserting the panel 8, provided with a cutout 8a, downwardly.

Figure 5:
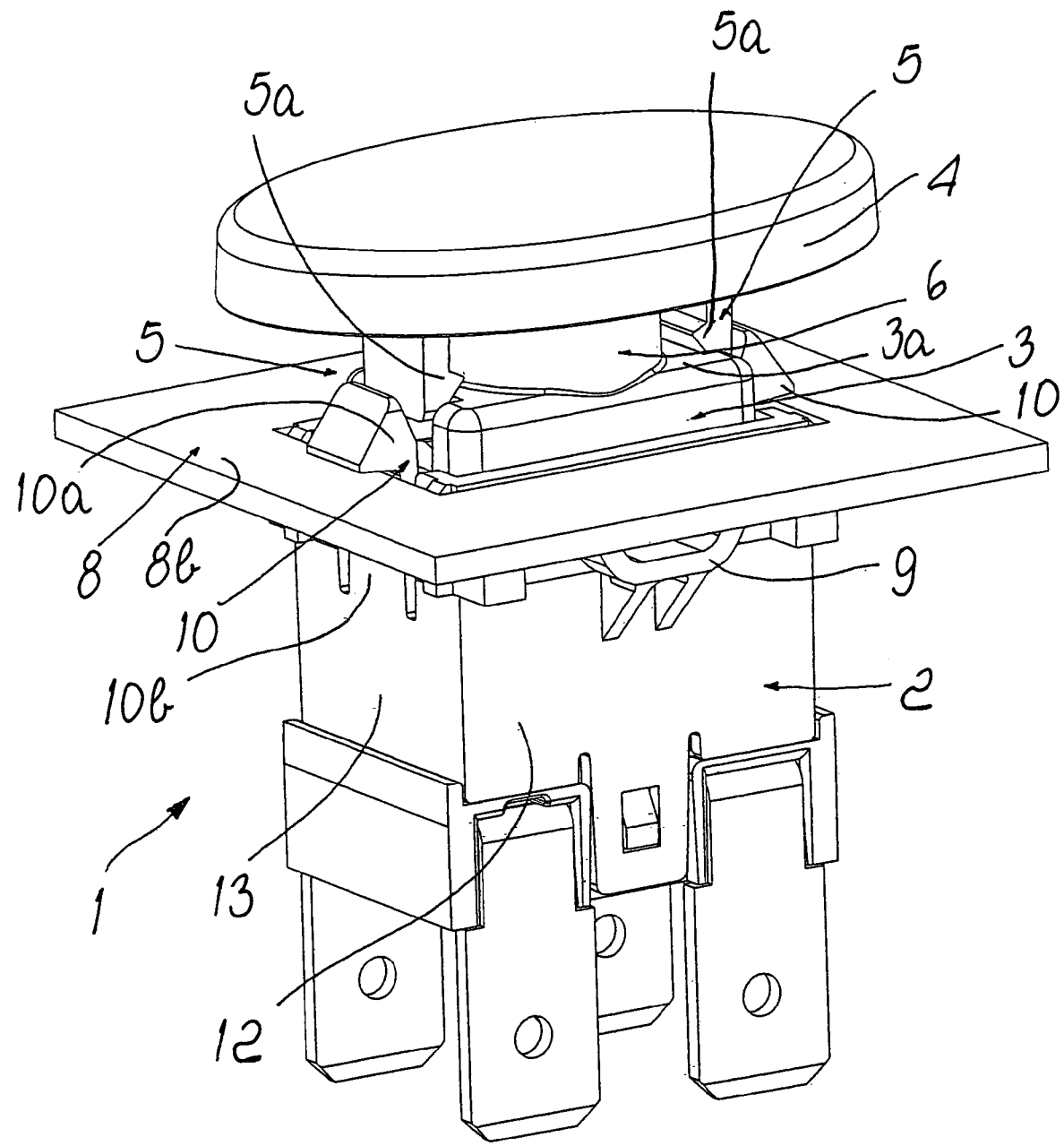
FIG. 5 is a view, similar to FIGS. 3 and 4, of the switch in the assembled condition.
Figure 7:
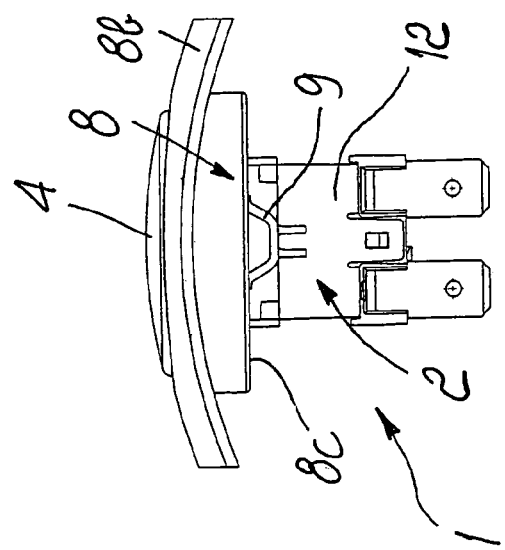
FIG. 7 is a side elevation view of a switch according to the invention, associated with a different panel type.
Figure 9:
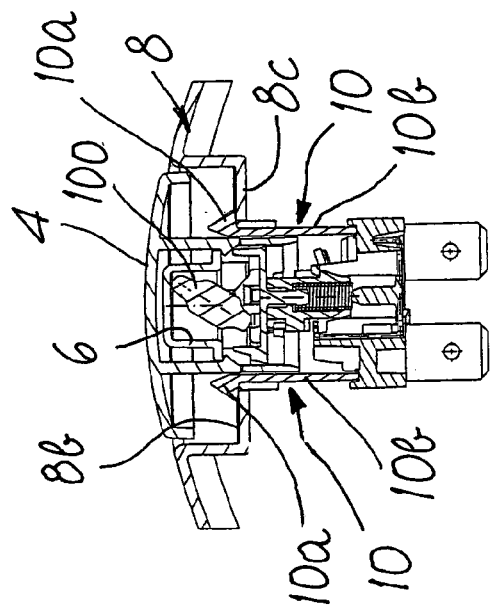
FIG. 9 is a sectional view of the switch of FIGS. 7 and 8, taken along the plane of arrangement IX—IX of FIG. 8.
Figure 8:
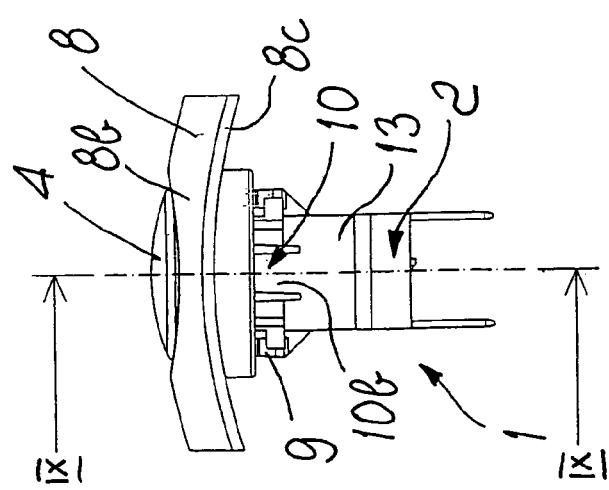
FIG. 8 is a side elevation view of the switch of FIG. 7.
Figure 12:
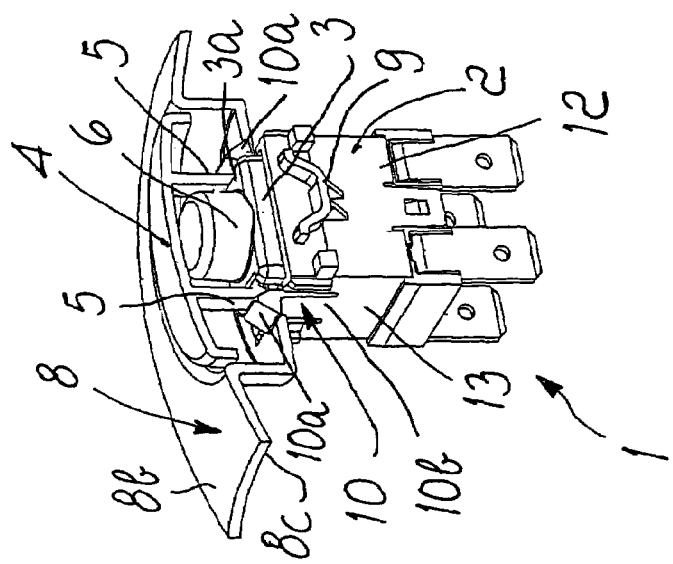
FIG. 12 is a perspective view of the switch, with the panel and the button disassembled and with the panel shown only partially for the sake of greater clarity.
Figure 13:
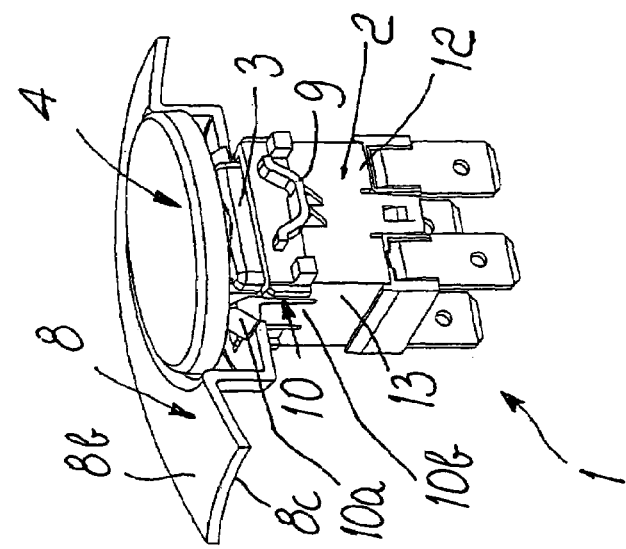
FIG. 13 is a view, similar to FIG. 12, with the panel and the button assembled.
Figure 14:
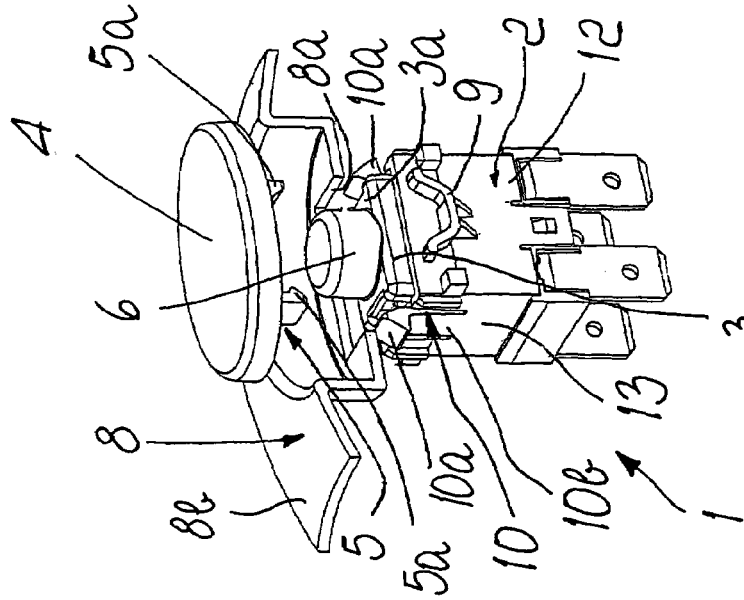
FIG. 14 is a view, similar to FIGS. 3 and 4, of the switch with the panel and the button during assembly.

The fixing means 7 are constituted by at least two abutment portions 9 and by at least two locking elements 10, which, when said panel is in the assembled position (as shown in FIG. 5), are designed to act respectively at opposite faces 8b and 8c of the panel 8.

In greater detail, the locking elements 10 are arranged in a position which, during use, is proximate to the button 4, while the abutment portions 9 are in a distal position with respect to the button 4.

According to a preferred embodiment, the abutment portions 9 are rigidly coupled to the switch body 2 and are substantially U-shaped.

The locking elements 10 can instead be provided by providing a locking head 10a, which is connected to the switch body 2 by way of elastically flexible connection means 10b, which allow, during the backpanel insertion of the panel 8, the movement of the locking heads 10a along a movement direction which is substantially parallel to the plane of arrangement of the panel 8 (and therefore perpendicular to the direction of insertion of the panel 8).

Advantageously, the elastically flexible connection means 10b can be constituted by a lamina which connects the switch body 2 and the respective locking head 10a, such lamina being arranged so that its longitudinal dimension is substantially perpendicular, during use, to the plane of arrangement of the panel 8.

Conveniently, the detachable connection means 5 comprise at least two locking teeth 5a, which are supported by the button 4 and can be inserted within a respective locking seat 11 formed on the control actuator 3.

According to an important aspect of the present invention, the detachable connection means 5 are designed to keep the elastically flexible connection means 10b in the locked position.

In particular, as clearly shown in the sectional view of FIG. 2, the insertion of the locking teeth 5a within the respective locking seats 11 allows to keep the elastically flexible connection means 10b (and particularly the connection laminas) pushed outwardly, preventing their mutual approach, which might cause the separation of the panel 8 from the switch body 2.

According to a preferred embodiment, the switch body 2 has a first pair of mutually opposite side walls 12 and a second pair of mutually opposite side walls 13, which are connected to each other so as to form a cylindrical surface which has a substantially rectangular transverse cross-section.

Each side wall 12 of the first pair of side walls supports an abutment portion 9, while each side wall 13 of the second pair of side walls supports a locking element 10.

Advantageously, the side walls 12 are larger than the side walls 13.

Operation of the switch according to the invention is evident from what has been described above.

In particular, by inserting the panel 8 by backpanel mounting, its face 8c is made to abut against the abutment portions 9. At the same time, the elastically flexible connection means 10b tend to move mutually closer, also due to the "pointed" inclined portion of the locking heads 10a, so as to produce a transverse dimension which is smaller than that of the cutout 8a of the panel 8.

When the panel 8 abuts against the abutment portions 9, the locking heads 10a are arranged completely on the opposite side of the panel 8 with respect to the abutment portions 9 (as shown in FIG. 5), allowing the elastically flexible connection means 10b to return to the initial condition.

By inserting at this point the locking teeth 5a within the respective locking seats 11, the elastically flexible connection means 10b are kept in this condition (in which the panel 8 is locked), preventing any accidental separation of the panel 8 from the switch body.

All the characteristics of the invention described above as advantageous, convenient or the like may also be omitted or be replaced with equivalents.

The invention thus conceived is susceptible of numerous modifications and variations, all of which are within the scope of the appended claims.

In practice it has been found that the invention has achieved the intended aim and objects in all the embodiments.

In practice, the materials used, so long as they are compatible with the contingent use, as well as the contingent shapes and dimensions, may be any according to requirements.

All the details may further be replaced with other technically equivalent elements.

The disclosures in Italian Utility Model Application No. VR2004U000040 from which this application claims priority are incorporated herein by reference.

What is claimed is:

1. A backpanel insertion switch comprising: a switch body; a control button; a control actuator that is connectable with the control button and is mountable in and so as to be movable with respect to said switch body; a receptacle for a light source provided in a containment portion of said control actuator arranged in mounted position at an end of said switch body directed toward said button; fixing means provided on said switch body for fixing a panel upon backpanel insertion thereof on said switch body, the panel comprising respective opposite faces thereof and an insertion cutout, said fixing means comprising at least two abutment portions and at least two flexible locking elements, said at least two flexible locking elements being located proximate to said button in mounted position and being adapted to move mutually closer so as to pass through said cutout at the insertion of the panel on the switch body that is performed, when said switch body is arranged with said end thereof in an upward position, along a downward insertion direction and until the panel bears, in mounting position, with a first one of said opposite faces thereof against said abutment portions, whereupon said flexible locking elements are adapted to move back apart to act on a second one of said opposite surfaces of the panel; and detachable connection means for providing detachable connection between said button and said control actuator.

2. The switch according to claim 1, wherein said at least two abutment portions are rigidly coupled to said switch body, said at least two locking elements comprising respectively a locking head connected to said switch body by way of elastically flexible connection means which allow, during the backpanel insertion of said panel, the movement of said locking heads along a movement direction which is substantially parallel to the plane of arrangement of said panel.

3. The switch according to claim 2, wherein said elastically flexible connecting means comprise a lamina for mutually connecting said switch body and said respective locking head, said lamina being arranged along a longitudinal direction which is substantially perpendicular, during use, to the plane of arrangement of said panel.

4. The switch according to claim 2, wherein said detachable connection means are designed to keep in the locked position said elastically flexible connection means.

5. The switch according to claim 1, wherein said detachable connection means comprise at least two locking teeth, which are supported by said button and can be inserted within a respective locking seat formed in said control actuator.

6. The switch according to claim 1 wherein said switch body has a first pair of mutually opposite side walls and a second pair of mutually opposite side walls, which are connected to each other so as to form a continuous surface which has a substantially rectangular transverse cross-section, each side wall of said first pair of side walls having at least one of said at least two abutment portions and each side wall of said second pair of side walls having at least one of said at least two locking elements.

7. A backpanel insertion switch comprising: a switch body; a control button; a control actuator that is connectable with the control button and is mountable in and so as to be movable with respect to said switch body; a receptacle for a light source provided in a containment portion of said control actuator arranged in mounted position at an end of said switch body directed toward said button; fixing means provided on said switch body for fixing a panel upon backpanel insertion thereof on said switch body, the panel comprising respective opposite faces thereof and an insertion cutout, said fixing means comprising at least two abutment portions and at least two locking elements, said at least two locking elements comprising each a locking head and an elastically flexible lamina connecting the head to the switch body and being located with said heads proximate to said button in mounted position, the heads being movable upon deflection of said laminae closer to each other so as to pass through said cutout at the insertion of the panel on the switch body that is performed, when said switch body is arranged with said end thereof in an upward position, along a downward insertion direction and until the panel bears, in mounting position, with a first one of said opposite faces thereof against said abutment portions, whereupon said heads are movable back apart by elastic restoration of said laminae to act on a second one of said opposite surfaces of the panel; and detachable connection means for providing detachable connection between said button and said control actuator.

8. A backpanel insertion switch comprising: a switch body; a control button; a control actuator that is connectable with the control button and is mountable in and so as to be movable with respect to said switch body; a receptacle for a light source provided in a containment portion of said control actuator arranged in mounted position at an end of said switch body directed toward said button; fixing means provided on said switch body for fixing a panel upon backpanel insertion thereof on said switch body, the panel comprising respective opposite faces thereof and an insertion cutout, said fixing means comprising at least two abutment portions and at least two locking elements, said at least two locking elements comprising each a locking head and an elastically flexible lamina connecting the head to the switch body and being located with said heads proximate to said button in mounted position, the heads being movable upon deflection of said laminae closer to each other so as to pass through said cutout at the insertion of the panel on the switch body that is performed, when said switch body is arranged with said end thereof in an upward position, along a downward insertion direction and until the panel bears, in mounting position, with a first one of said opposite faces thereof against said abutment portions, whereupon said heads are movable back apart by elastic restoration of said laminae to act on a second one of said opposite surfaces of the panel; and detachable connection means for providing detachable connection between said button and said control actuator, said detachable connection means being constituted by locking teeth adapted for insertion, on mounting, in respective locking seats formed in said control actuator that is suitable to prevent mutual approaching of said heads.

* * * * *